(12) United States Patent
Mair et al.

(10) Patent No.: US 11,187,260 B2
(45) Date of Patent: Nov. 30, 2021

(54) FACADE PANEL SCREW AND FASTENING ARRANGEMENT THEREWITH

(71) Applicant: SFS intec Holding AG, Heerbrugg (CH)

(72) Inventors: Roland Mair, Gotzis (AT); Oliver Bachmann, Widnau (CH); Markus Andersag, Lustenau (AT)

(73) Assignee: SFS intec Holding AG, Heerbrugg (CH)

( * ) Notice: Subject to any disclaimer, the term of this patent is extended or adjusted under 35 U.S.C. 154(b) by 238 days.

(21) Appl. No.: 16/429,556

(22) Filed: Jun. 3, 2019

(65) Prior Publication Data

US 2019/0368529 A1 Dec. 5, 2019

(30) Foreign Application Priority Data

Jun. 4, 2018 (EP) ...................................... 8175689

(51) Int. Cl.
*F16B 25/00* (2006.01)

(52) U.S. Cl.
CPC ...... *F16B 25/0063* (2013.01); *F16B 25/0068* (2013.01); *F16B 25/00* (2013.01)

(58) Field of Classification Search
CPC .. F16B 25/00; F16B 25/0057; F16B 25/0063; F16B 25/0068; F16B 25/10; F16B 33/02; F16B 35/041
USPC .............. 411/386, 387.2, 411, 412, 423, 424
See application file for complete search history.

(56) References Cited

U.S. PATENT DOCUMENTS

| 3,682,507 A | * | 8/1972 | Waud | F16B 25/0063 |
| | | | | 411/413 |
| 3,746,067 A | * | 7/1973 | Gulistan | F16B 43/00 |
| | | | | 411/361 |
| 4,662,806 A | * | 5/1987 | Reed | B23P 6/04 |
| | | | | 206/231 |

(Continued)

FOREIGN PATENT DOCUMENTS

| DE | 3420863 | 1/1985 |
| DE | 19640585 | 4/1998 |

(Continued)

*Primary Examiner* — Roberta S Delisle
(74) *Attorney, Agent, or Firm* — Volpe Koenig

(57) ABSTRACT

A facade panel screw for the optimized fastening of facade panel elements to a substructure has a head having a very large diameter, a subsequent, essentially cylindrical shaft section (22) extending along a central longitudinal axis (A) and a subsequent tip region (23). The shaft section (22) includes, as viewed from the head, a threadless underhead section (24), a stop collar (25) and a threaded section (28). The thread in a first part (26) of the threaded section (28) subsequent to the stop collar (25) has an outer diameter $D_r$, which is attenuated compared to the thread in a second part (27) with outer diameter $D_n$, over several convolutions, so that $D_r < D_n$. This threaded section 26 allows a controlled overwinding of the facade panel screw in use. A corresponding fastening arrangement includes a facade panel, a substructure for transferring the load to a building surface and the facade panel screw.

15 Claims, 1 Drawing Sheet

(56) References Cited

U.S. PATENT DOCUMENTS

| | | | | |
|---|---|---|---|---|
| 5,094,579 A | * | 3/1992 | Johnson | F02B 77/00 |
| | | | | 411/107 |
| 5,295,774 A | * | 3/1994 | Roberts | B21H 3/027 |
| | | | | 411/387.2 |
| 5,649,798 A | * | 7/1997 | Ito | F16B 43/00 |
| | | | | 411/369 |
| 5,782,595 A | * | 7/1998 | Schneider | F16B 5/025 |
| | | | | 411/352 |
| 6,183,182 B1 | | 2/2001 | Baumgartner | |
| 6,296,433 B1 | * | 10/2001 | Forsell | F16B 25/00 |
| | | | | 411/386 |
| 7,156,600 B2 | * | 1/2007 | Panasik | B21H 3/02 |
| | | | | 411/308 |
| 7,713,013 B2 | * | 5/2010 | Sedgwick | F16B 23/0092 |
| | | | | 411/411 |
| 8,430,618 B2 | * | 4/2013 | Baer | F16B 35/041 |
| | | | | 411/387.2 |
| 2007/0183866 A1 | * | 8/2007 | Gallien | F16B 45/00 |
| | | | | 411/401 |
| 2009/0148254 A1 | * | 6/2009 | Carrillo, Sr. | F16B 35/06 |
| | | | | 411/404 |
| 2010/0239386 A1 | * | 9/2010 | Sedgwick | A47G 1/20 |
| | | | | 411/402 |
| 2020/0116187 A1 | * | 4/2020 | Chen | F16B 25/0063 |

FOREIGN PATENT DOCUMENTS

| | | |
|---|---|---|
| GB | 2142108 | 1/1985 |
| WO | 2015035374 | 3/2015 |

* cited by examiner

FACADE PANEL SCREW AND FASTENING ARRANGEMENT THEREWITH

INCORPORATION BY REFERENCE

The following documents are incorporated herein by reference as if fully set forth: European Patent Application No. 18175689.1, filed Jun. 4, 2018.

FIELD

The present invention relates to a facade panel screw having improved installation properties and a facade fastening arrangement having such a facade panel screw.

BACKGROUND

In the following, in connection with facade panel screws, a screw is defined that is designed specifically for the fastening of panels or panel-shaped components (facade panels) to a metallic substructure, wherein the material thickness of the substructure is only a few millimeters at the fastening point. The application should not be limited to vertical fastening arrangements and facades. The term panel, facade panel or panel-shaped component refers to all substantially flat-extended covering elements, which need not necessarily have homogeneous thickness. Such facade panels can be manufactured with a variety of materials, for example, they can be made of fiber cement, plastic, metal, wood or in sandwich construction of such materials.

The facade panels are usually fastened on a substructure that holds the facade panel in position in front of the static-bearing building wall. The substructure must be able to accommodate the weight of the facade panels, occurring wind loads, and also the different thermal expansion.

A fundamental requirement of the facade panel fastening is that it is also able to dissipate external forces acting on the panel in the substructure in addition to the facade panel's own weight. Wind suction and wind pressure and elongation stress caused by solar radiation must be dissipated via the fastening points. Therefore, a substructure is usually designed with metal profile elements. As a compromise between static needs and costs, a material thickness of 2 to 6.5 mm of aluminum or 0.9 to 2.5 mm of steel is usually used at the fastening point, for the described application of panel-shaped facade elements having 8-14 mm thickness.

Basically, it is important that screws for fastening the facade panel have a high reverse torque, because a loosening screw could lead to vibration, rattling or falling away of facade panels.

PRIOR ART

Various solutions for facade panel fastening are known in the prior art. In invisible constructions, the fastening points or elements are attached alone on the back side and are thus not visible to the viewer after installation. Installation, maintenance and repair, however, are expensive.

Rivet connections, in particular blind rivet connections and screw connections (also in combination with adhesive holders) can be used for visible fasteners. In most cases, the facade panel elements are pre-drilled in order to minimize the effort on the construction site and to ensure a uniform image of the facade. These pre-drilled holes are dimensioned comparatively large in order to allow the facade panel elements to expand in the laying plane relative to the fastening point when there is thermal expansion. On the other hand, such cannulations of the facade panel, which are significantly larger than the nominal diameter of the screw used, offer the screw virtually no guidance during the setting process.

Self-tapping screws which do not require pre-drilling in the substructure are often used in screw connections. These self-tapping screws can be made as bimetallic screws having a head and shaft made of stainless steel and a welded drill bit made of C-steel. The setting of self-tapping screws requires a very clean processing, because the correction of an incorrectly set screw, for example, by oblique or not centric boring, can only be corrected with effort.

Self-tapping screws can also be made in one piece in stainless steel for use on aluminum substructures. In such cases, the tip of the screw is often equipped with a cone having a cone angle of 25-45°, which is usually sufficient in conjunction with a thread forwarded to the tip in order to penetrate aluminum up to 2.5 mm thickness without pre-drilling.

Against this background, it does not seem rational to perform pre-drilling on the substructure on-site at the construction site, because this makes (pre-)drilling and screwing two separate work operations. However, the separation also has advantages when there is expensive facade materials or when particularly high quality of workmanship and above-average loadability of each individual fastening point are required.

A drilling jig can be used for pre-drilling of the substructure, which drilling jig uses the prefabricated cannulations of the facade panel as a guide: for example, a sleeve drill-mounted, concentric to the drill sleeve and attached to the drilling device, the sleeve's outer diameter coinciding with the diameter of the facade panel bore. As a result, the holes in the substructure are aligned exactly concentrically with the facade panel and the screw pattern on the facade becomes more precise. Furthermore, self-drilling Bi-Metal screws can be dispensed with, self-tapping screws, preferably stainless steel screws, suffice.

As mentioned, great care is required in the visible fastening of the facade panel elements and therefore structural measures that make the fastening process more secure are always required.

Motor-driven setting tools such as cordless screwdrivers are often used when setting screws. So-called tangential impact wrenches or impulse wrenches are simpler and easier to buy and handle than these. However, these setting tools make it more difficult to define the completion of the setting process via a torque limiter. A screw according to the prior art will end the insertion process when the head strikes the component surface and the torque required thus exceeds the performance of the setting tool. However, depending on the setting conditions, the thread of the screw can pull out or the thread in the substructure can fail. Then the screw would overwind and would no longer achieve the required holding forces. However, the action of the head underside can also damage the facade panel—color chips, scratches in the surface, abrasion of corrosion protection.

So far, this effect has been avoided by the facade panel screws receiving a separate stop collar on the screw shaft below the actual screw head. The distance between the underside of the screw head and the stop collar (underside) corresponds to the thickness of the facade panel element to be installed plus a tolerance of a few millimeters. This tolerance is utilized in the installed state by a damping element made of foam, which is arranged between the underside of the facade panel and the substructure. When setting this facade panel screw, the setting depth is thus defined by the additional stop collar, which rests against the substructure and not by the screw head.

As shown in FIG. 1, this stop collar will always be designed smaller in diameter than the screw head, but still must be stable enough to receive the torque of the setting tool at the moment when the stop collar reaches its desired position.

However, a solid stop collar can only be achieved by upsetting the screw blank during manufacture, thus requiring a further method step. In addition, the material for the massive stop collar must be present, thus additionally increasing the cost of materials.

SUMMARY

The object of the invention is therefore to describe a facade panel screw or a fastening arrangement for facade panels, which requires fewer manufacturing steps, is safe to handle, makes no change to the usual processing in the construction and can be used with a variety of setting tools and furthermore is economical to manufacture.

This object is achieved by a facade panel screw having one or more features of the invention. A fastening arrangement is also described having one or more features of the invention. Further variants and exemplary embodiments are described below and in the claims.

A facade panel screw 20 has a basic construction having: a head 21, a subsequent, essentially cylindrical shaft section 22, which extends along a central longitudinal axis A, and a subsequent tip region 23. The shaft section 22 can in turn, viewed from the head, divide into a threadless underhead section 24, a stop collar 25 and a threaded section 28. The threaded section 28 in turn can be subdivided into a first part 26, which is arranged subsequent to the stop collar 25 and has an outer diameter $D_r$ and a subsequent part 27 having outer diameter $D_n$. The first part 26 is attenuated over several convolutions compared to the thread in the second part 27, so that $D_r < D_n$. Attenuation means attenuation of the diameter (preferred solution) instead of (alternatively) a proportional reduction of a thread course or an attenuation of the thread width by, for example, steeper thread flanks.

Technically, this thread attenuation achieves reduction of the engagement of the facade panel screw in the substructure at the fastening point and being able to overwind the screw in a controlled manner when the screw strikes the stop collar. As a result, on the one hand, a security against reverse rotation is achieved, at the same time, the remaining, attenuated convolutions still provide holding surfaces. The attenuated thread allows a better, remaining clamping than a threadless section and the material of the substructure is less stressed during overwinding.

Preferably, the thread of threaded section 26 (attenuated) will pass uninterrupted into threaded section 27, in other words, the entire threaded section 28 can be manufactured by appropriate design of the tool in one operation. Most preferably, the pitch in the entire threaded section 28 is the same size, since this is additionally easy to manufacture.

A further facilitation during installation is achieved when the thread of the facade panel screw is designed having multiple threads, in particular double-threaded, in the threaded section 28. On the one hand, the high pitch results in a high setting speed; due to the double design of the convolution, a better load transfer into the substructure and a more stable forming behavior during setting continue to take place.

It has been found that an attenuation between 10% and 30% of the nominal diameter (outer diameter) $D_n$ of the thread in section 27 is sufficient. Alternatively, when the attenuated diameter $D_r$ is set in relation to $D_n$, $D_r = a\, D_n$, where a assumes values between 0.7 and 0.9 (each inclusive).

Most preferably, this attenuation of the thread diameter is realized in the region 26 below the stop collar 25 as an axially parallel removal of the thread crests 29. The thread thus carries, instead of a thread crest or a thread tip in the said area, an (essentially) flat plateau, wherein the plateau is aligned parallel to the center axis A.

Furthermore, a facade panel screw according to the invention will have a specially dimensioned stop collar 25. Its diameter $D_b$ is greater than $D_n$ (thread diameter in section 27). Mathematically formulated, $D_b = b\, D_n$, wherein b can assume values between 1.07 and 1.24, preferably between 1.1 and 1.2 (each inclusive). The stop collar will thus exceed the thread only between 7% and 24%, preferably between 10% to 20%.

Further preferably, the stop collar (25) is also designed very narrow. Its axial extent, that is, viewed in the shaft orientation, will be less than 1 mm, preferably between 0.5 to 0.8 mm.

Surprisingly, this very narrow design is sufficient to achieve the function as a stop collar in conjunction with the attenuated thread in section 26. As mentioned, the torque to be absorbed is already reduced by allowing overwinding in section 26. The narrow collar is therefore sufficient. Due to its slim design, it is also able to form to a certain extent to the substructure and thus assumes a better force closure than a massive stop. The third advantage is that this narrow connection collar does not have to be manufactured by upsetting, but can be realized as a thread closure and thus can be provided in the thread forming in the same tool.

In one embodiment, in a case of application, the stop collar 25, viewed radially, could be so designed so that it protrudes beyond the thread crests in the threaded section 27 by less than 1 mm, with a $D_n$ of 5.8 mm.

A facade panel screw according to the invention can have a self-drilling, a self-tapping or a drill point in the tip region 23. The use depends primarily on the material of the substructure, usually 2 to 6.5 mm for aluminum or 0.9 to 2.5 mm for steel.

The use of such inventive facade panel screw is done in a fastening arrangement, which comprises a (already mentioned) substructure, a facade panel and a facade panel screw. Preferably, the substructure is designed as a metal construction. The load-bearing elements can be made of metal pipes, profiles or components. The number of fastening points is oriented to the weight and size of the facade elements, to wind load calculations (depending on the position and height of a building) and on the required aesthetics. Typically, a material thickness of 2 to 6.5 mm for aluminum or 0.9 to 2.5 mm for steel at the fastening point is selected for most applications.

The facade panels are very often made of plastic, metal, fiber cement, insulation materials or a composite of one or more such materials. The facade panel screw described is part of a coordinated system. In this case, the axial length/extension of the underhead section 24 is selected such that the following applies: thickness of the facade panel plus 2-4 mm. This 2-4 mm additional intermediate space is filled during installation by a damping, insulating, friction-reducing and/or adhesive intermediate layer between the substructure and the facade panel. In particular, the intermediate layer (24) can be designed as a foam tape, an adhesive tape, an insulating felt or as a plastic layer.

DETAILED DESCRIPTION

Figure 1:
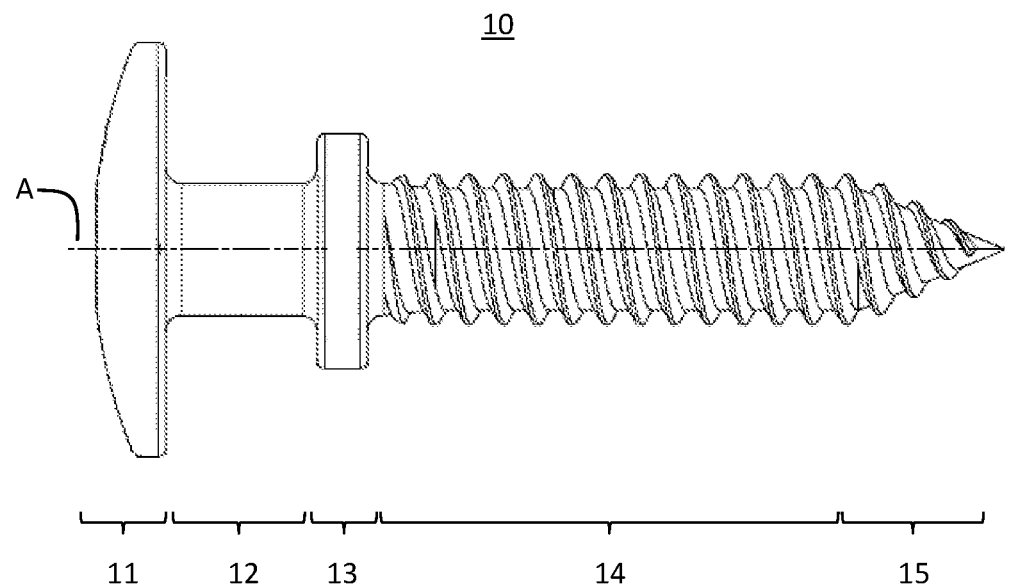
FIG. 1 shows a facade panel screw according to the prior art.

FIG. 1 shows a facade panel screw 10 with its most important components. It has a large diameter head 11, the diameter of which is usually chosen so that a covering of the borehole is ensured, which is provided in the facade panel. By default, this borehole is chosen to be larger than the nominal diameter of the screw in order to give lateral clearance even in the fastened state of the facade panel. Differences in thermal expansion between the substructure and facade panel can be compensated by this. The head 11 must therefore usually be significantly oversized.

The head is followed by a threadless underhead section 12 and a stop collar 13. Its effect has already been described in the "Prior Art" section above. Subsequently, seen facing away from the head toward the tip, a threaded section 14 follows, which merges into a tip 15. The thread is usually continued at least partially on the tip. There are many known designs of tips in the prior art that are shown here, shown only by way of example.

Figure 2:
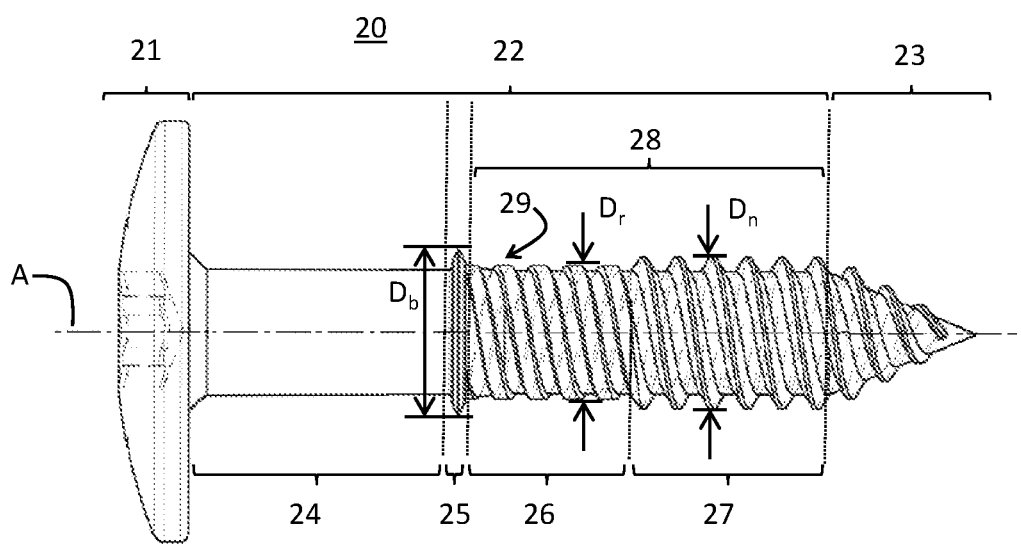
FIG. 2 shows a facade panel screw according to the invention.

FIG. 2 shows a direct comparison of a facade panel screw 20 according to the invention. It has a head 21, the dimensions of which must meet the same requirements as the design according to the prior art. An essentially cylindrical shaft 22 follows the head 21 with a subsequent or the screw final tip region 23. All three have a common, central center axis A.

The shaft section 22 is comprised of a threadless underhead section 24 following the underside of the screw head 21, a stop collar 25 having a design according to the invention and a threaded section 28. This in turn is divided into a section 26 having attenuated thread 29 and a section 27 with conventional thread design. The thread in section 27 has a nominal diameter $D_n$ as shown in FIG. 2. The attenuated thread 29 has a diameter $D_r<D_n$. The stop collar 25 has a diameter $D_b$, so that in total $D_b>D_n>D_r$.

The screw tip in the tip region 23 is again shown here by way of example as a self-tapping embodiment, but this is not to be understood as limiting.

The features of the invention disclosed in the above description, in the drawings and in the claims can be essential for the realization of the invention both individually and in any however technically reasonable or advantageous combination. A non-explicit representation or description of a combination of features does not mean that such a combination is excluded.

The invention claimed is:

1. A facade panel screw (20), comprising:
    a head (21);
    a cylindrical shaft section (22) that extends along a central longitudinal axis (A);
    a tip region (23);
    the cylindrical shaft section (22), viewed from the head, comprises:
        a threadless underhead section (24),
        a stop collar (25), and
        a threaded section (28);
    a thread in a first part (26) of the threaded section (28) subsequent to the stop collar (25) has an outer diameter $D_r$, which is attenuated over several convolutions compared to the thread in a second part (27) having an outer diameter $D_n$, so that $D_r<D_n$.

2. The facade panel screw (20) according to claim 1, wherein the thread of the first part of threaded section (26) merges continuously into the thread of the second part of the threaded section (27).

3. The facade panel screw (20) according to claim 1, wherein a pitch in an entirety of the threaded section (28) is equally large.

4. The facade panel screw (20) according to claim 1, wherein the thread in the threaded section (28) includes multiple threads.

5. The facade panel screw (20) according to claim 1, wherein $D_r=a\, D_n$, and a can assume values between 0.7 and 0.9, each inclusive.

6. The facade panel screw (20) according to claim 1, wherein the attenuation is achieved by axially parallel removal of thread crests (29).

7. The facade panel screw (30) according to claim 1, wherein the stop collar (25) has a diameter $D_b$ for which applies: $D_b=b\, D_n$, wherein b assumes values between 1.07 and 1.24, each inclusive.

8. The facade panel screw (20) according to claim 1, wherein the stop collar (25) has an axial extent of less than 1 mm.

9. The facade panel screw (20) according to claim 1, wherein the stop collar (25), viewed radially, protrudes beyond thread crests of the thread in the second part of the threaded section (27) by less than 1 mm.

10. The facade panel screw (20) according to claim 1, wherein the tip region (23) is self-drilling, self-tapping, or a drill bit.

11. A fastening arrangement comprising:
    a substructure;
    a facade panel; and
    the facade panel screw (20) according to claim 1 that connects the facade panel to the substructure.

12. The fastening arrangement according to claim 11, wherein the substructure is a metal construction and at a fastening point has a material thickness of 2 to 6.5 mm of aluminum or 0.9 to 2.5 mm of steel.

13. The fastening arrangement according to claim 11, wherein the facade panel is made of plastic, metal, fiber cement, insulation materials or a composite of one or more such materials.

14. The fastening arrangement according to claim 11, wherein the underhead section (24) has an extension in an axial direction, which results as a thickness of the facade panel plus 2-4 mm.

15. The fastening arrangement (20) according to claim 11, further comprising at least one of a damping, insulating, friction-reducing or adhesive intermediate layer attached between the substructure and the facade panel.

* * * * *